United States Patent [19]
Gibbs

[11] Patent Number: 4,522,539
[45] Date of Patent: Jun. 11, 1985

[54] DOWELLING JIG

[75] Inventor: Andrew R. Gibbs, Stockton Near Rugby, England

[73] Assignee: Stanley Tools Limited, Sheffield, England

[21] Appl. No.: 466,291

[22] Filed: Feb. 14, 1983

[30] Foreign Application Priority Data

Mar. 2, 1982 [GB] United Kingdom ................. 8206004

[51] Int. Cl.³ .............................................. B23B 49/02
[52] U.S. Cl. .................................. 408/72 R; 408/97; 408/115 R
[58] Field of Search .................. 408/72 R, 115 R, 79, 408/103, 97, 72 B, 115 B

[56] References Cited

U.S. PATENT DOCUMENTS

| 2,167,082 | 7/1939 | Morris | 408/115 X |
| 2,466,023 | 4/1949 | Griffin | 408/115 X |
| 2,740,308 | 4/1956 | Blanchard | 408/72 |
| 2,798,520 | 7/1957 | Maskulka et al. | 408/72 X |
| 2,838,966 | 6/1958 | Campbell | 408/115 |
| 3,674,376 | 7/1972 | Silken | 408/115 |
| 4,153,384 | 5/1979 | Isaken | 408/115 R |
| 4,176,989 | 12/1979 | Wolff | 408/72 R |
| 4,294,567 | 10/1981 | Wiggins | 408/72 R |

FOREIGN PATENT DOCUMENTS 2092488 8/1982 United Kingdom ............ 408/115 R

Primary Examiner—William R. Briggs
Assistant Examiner—Glenn L. Webb
Attorney, Agent, or Firm—Prutzman, Kalb, Chilton & Alix

[57] ABSTRACT

A dowelling jig (1) comprises a through-hole (5) for guiding a drill (18), abutments (12, 12) and cantilever springs (13, 13) for clipping the jig to one edge (10) of boarding (11) for drilling dowel-holes (2, 2, 2) in the edge, and a peg (9) for insertion in each dowel-hole (2) in turn for drilling the corresponding dowel-hole (3, 3, 3) in a face (14) of a second piece of boarding (15). The through-hole (5) extends between parallel faces (6) to which face (7) is perpendicular. Through-hole (5) axis is perpendicular to faces (6) and (19) while peg (9) is perpendicular to face (7). Abutments (12, 12) align face (19) of boarding (11) with face (7) for drilling of holes (2, 2).

10 Claims, 12 Drawing Figures

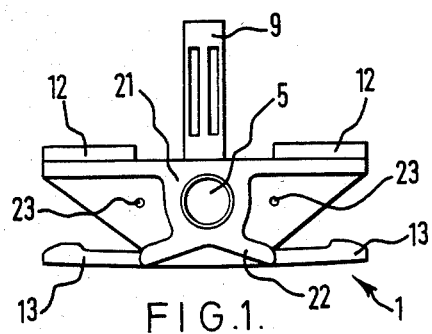
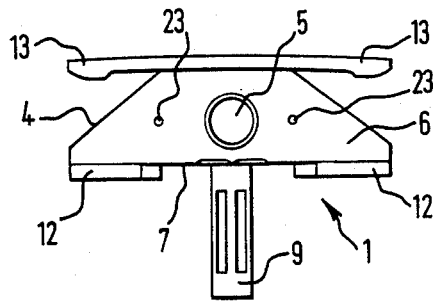
FIG.1.  FIG.2.
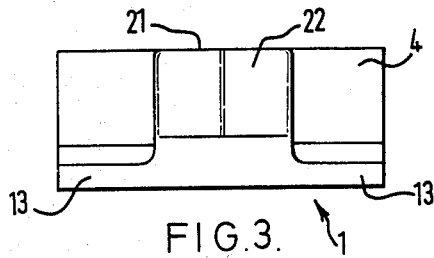
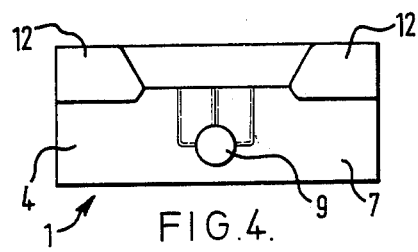
FIG.3.  FIG.4.
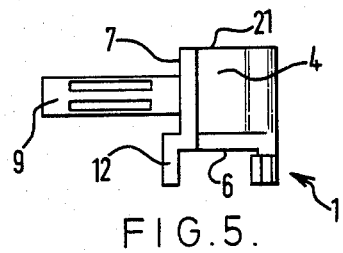
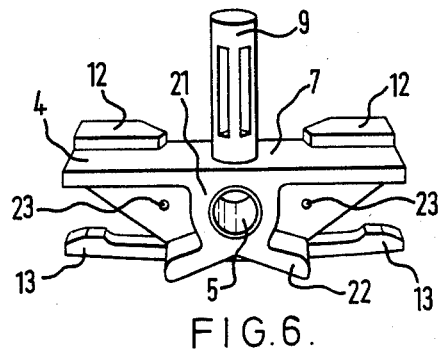
FIG.5.  FIG.6.
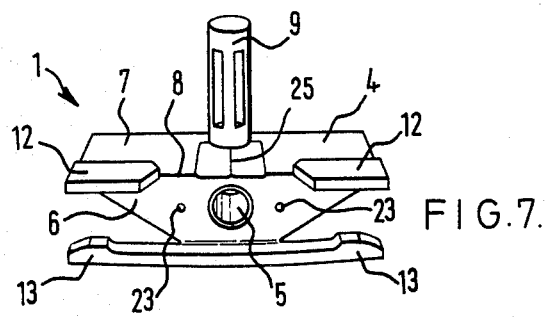
FIG.7.

4,522,539

DOWELLING JIG

FIELD OF THE INVENTION

This invention relates to a dowelling jig for use in drilling dowel-holes for dowels.

BACKGROUND OF THE INVENTION

For joining two pieces of boarding together so that an edge of one piece abuts a face of the other piece, it is common practice to join them using dowels, that is to say, pegs, each of which extends into its own hole in the edge of said one piece and, traversing the joint, also into a corresponding hole in the face of the other piece. It is virtually essential to use a jig of some kind in order to obtain accurate alignment of the dowel holes. However, most or all known jigs for this purpose are expensive and complicated.

SUMMARY OF THE INVENTION

According to the invention there is provided a dowelling jig for use in drilling dowel-holes for dowels, comprising a body member having a through-hole therein to guide a drill, means to locate said body member upon an edge of a piece of boarding or the like so that the through-hole is positioned to guide the drill for drilling a dowel-hole in the edge of the piece of boarding or the like, and a peg projecting from the body member perpendicularly to the axis of the through-hole such that the peg can be located in the dowel-hole drilled in the edge of the piece of boarding or the like to assist in locating said through-hole for drilling a corresponding dowel-hole in another member for dowelling the piece of boarding or the like to said other member.

BRIEF DESCRIPTION OF THE DRAWINGS

FIGS. 1 and 2 are two side elevational views of a dowelling jig embodying the invention, FIG. 2 showing the opposite side to FIG. 1 with the jig inverted;

FIGS. 3 and 4 respectively are a plan view and an underneath plan view of the dowelling jig of FIGS. 1 and 2;

FIG. 5 is an end elevational view of the dowelling jig of FIGS. 1 to 4;

FIGS. 6 and 7 are perspective views of the dowelling jigs of FIGS. 1 to 5 from opposite sides, FIG. 6 corresponding to FIG. 1 and FIG. 7 corresponding to FIG. 2 (inverted)

DESCRIPTION OF THE PREFERRED EMBODIMENT

Figure 8:
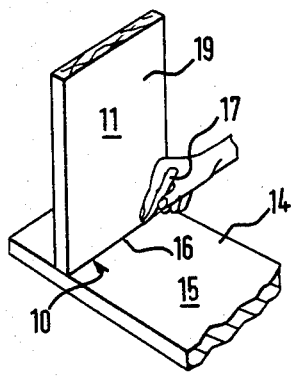
FIGS. 8 to 12 inclusive illustrate successive stages in using the dowelling jig of FIGS. 1 to 7 for drilling dowel-holes for dowels in two pieces of boarding.
Figure 9:
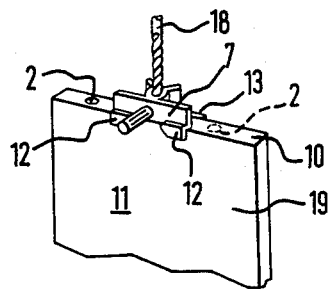
Figure 10:
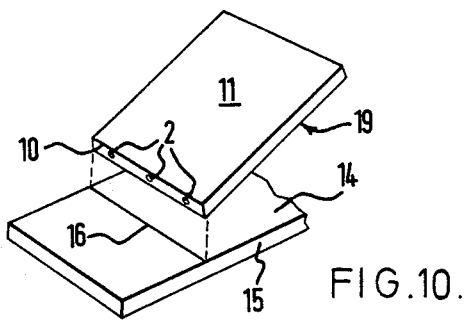
Figure 11:
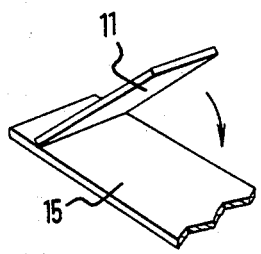

Referring to the drawings, the illustrated dowelling jig 1 is adapted for use in drilling dowel-holes 2, 3 (FIGS. 9, 10 and 12) for dowels (not shown). The dowelling jig 1 comprises a body member 4 having a through-hole 5 therein to guide a drill (not shown). The body member 4 has two mutually perpendicular faces 6, 7 which intersect along a reference edge-line 8. The through-hole 5 extends perpendicularly to and opens onto the first face 6, whilst a peg 9 projects perpendicularly from the second face 7, so that the peg 9 projects perpendicularly to the axis of the through-hole 5.

For the purpose of locating the body member 4 upon an edge 10 of a first piece of boarding 11, the dowelling jig 1 is provided with a pair of abutments 12, 12 and a pair of cantilever springs 13, 13 adjacent the first face 6. A center-line indicia mark 25 extends along the second face 7 perpendicularly from the referenced edge-line 8 in alignment with the axis of the peg 9 so that the drilled holes can be precisely located in reference to a pencil mark or a measure on the board 11.

In use, referring to FIGS. 8 to 12, supposing that it is desired to connect the edge 10 of the piece of boarding 11 to one face 14 of a second piece 15 of boarding, the first step (FIG. 8) is to place the edge 10 upon the face 14 in the desired position and to draw a line 16 by means of a pencil 17.

The next step (FIG. 9) is to clip the dowelling jig 1 to the edge 10 by means of the abutments 12, 12 and cantilever springs 13, 13 so that the through-hole 5 is positioned to guide a drill 18 for drilling a dowel-hole 2 in the edge 10 of the piece of boarding 11. The abutments 12 locate one face 19 of the boarding piece 11 substantially co-planarly with the second face 7 of body member 4, it being the face 19 which was utilised in the first step (FIG. 8) to draw the line 16 with pencil 17.

In fact, if (as is usual) not just one but two or three dowel-holes 2 are required, it is convenient to drill all three holes 2 in the edge 10 before drilling any dowel-holes 3 in face 14 of the second boarding piece 15.

Figure 12:
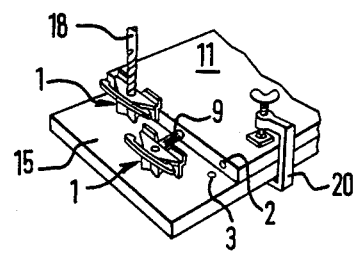

The next stage (FIGS. 10 and 11) is to lay boarding pieces 11 and 15 face-to-face (face 19 to face 14) and with edge 10 carefully aligned with the drawn line 16. Preferably the boarding pieces 11 and 15 are clamped in this position by means of a screw-clamp 20 (FIG. 12). Then the peg 9 of the dowelling jig 1 is inserted in each dowel-hole 2 in turn and a dowel-hole 3 is drilled in face 14 of boarding piece 15. FIG. 12 actually shows two dowelling jigs 1, but it is perfectly feasible to use a single dowelling jig 1, moving it from hole to hole as required.

The distance of the axis of peg 9 from face 21 is the same as the distance of the axis of through-hole 5 from the reference edge-line 8, so that when the first boarding piece 11 is dowelled to the second boarding piece 15, the face 19 becomes aligned with the drawn line 16.

Upon looking at FIG. 12, it will be appreciated that it is not face 6 but the opposite parallel face 21 of dowelling jig 1 which is placed against face 14 of boarding piece 15 for the drilling of dowel-holes 3. If the distance between the axis of peg 9 and the face 21 is less than the distance from the axis through-hole 5 and reference edge-line 8, the face 21 of the jig 1 will not abut the face 14 of the boarding piece 15 and thus the jig will not be supported by the board piece 15.

For pushing the peg 9 into each of the dowel-holes 2, the dowelling jig 1 is provided with a thumb-piece 22. In case it is desired to temporarily secure the dowelling jig 1 in position before drilling each of the dowel-holes 2 in edge 10, body member 4 is provided with a pair of narrow through-holes 23, 23 to receive tacking pins (not shown).

In modifications, not shown, the peg 9 is fitted with axially extending bowed springs for locating the peg 9 firmly in the drilled dowel-holes 2, whilst the illustrated cantilever springs 13, 13, which are of moulded plastics material integral with the body member 4, are replaced by steel cantilever springs for greater strength and resistance to breakage.

The through-hole 5 may or may not have a metal bushing lining it for the drill 18.

The illustrated dowelling jig has been designed for boarding of a standard thickness of 16 millimeters (mm.). Whilst a certain tollerance is permissible in the boarding thickness, thanks to the resilience of the cantilever springs 13, 13, boarding of a significantly different thickness would require another dowelling jig of a corresponding size.

I claim:

1. A dowelling jig for use in drilling dowel-holes for dowels, comprising a body member having two mutually perpendicular faces which intersect along a reference-edge line, a through-hole therein to guide a drill extending perpendicularly to and opening onto a first one of said faces, means to locate said body member upon an edge of a piece of boarding so that the through-hole is positioned to guide the drill for drilling a dowel-hole in the edge of the piece of boarding with the boarding edge engaging against said first face, said locating means having abutment means coplanar with the second face to locate one face of the piece of boarding substantially coplanarly with said second face of the body member at said reference-edge line for the drilling of the dowel-hole in the edge of the piece of boarding, and a peg in a fixed position spaced from the reference-edge line and projecting perpendicularly from the second one of said faces of the body member perpendicularly to the axis of the through-hole such that the peg can be located in the dowel-hole drilled in the edge of the piece of boarding with said boarding edge engaged against said second face for locating said through-hole for drilling a corresponding dowel-hole in another member for dowelling the piece of boarding to said other member.

2. A dowelling jig as claimed in claim 1 wherein said locating means comprises resilient means to resiliently engage an opposite face of the piece of boarding or the like.

3. A dowelling jig as claimed in claim 2 wherein said resilient means comprises at least one cantilever spring.

4. A dowelling jig as claimed in claim 1 wherein said body member comprises moulded plastics material and said through-hole is lined with a metal bush.

5. A dowelling jig as claimed in claim 1 wherein said body member has at least one further narrower through-hole to receive tacking pin means to restrain movement of the jig during drilling.

6. A dowelling jig as claimed in claim 3 wherein said body member comprises moulded plastics material and wherein said through-hole is lined with a metal bush and wherein said body member has at least one further narrower through-hole to receive tacking pin means to restrain movement of the jig during drilling.

7. A dowelling jig as claimed in claim 1 which comprises said body member having a third face parallel to said first face and perpendicular to the axis of said through-hole with the distance from the axis of said peg to said third face being equal to the distance from the axis of said through-hole to said reference-edge line.

8. A dowelling jig as claimed in claim 1 which comprises said body member having a third face parallel to said first face and perpendicular to the axis of said through-hole with the distance from the axis of said peg to said third face being less than the distance from the axis of said through-hole to said reference-edge line.

9. A dowelling jig as claimed in claim 1 where said second face includes a center-line marker indicia in alignment with the axis of said peg.

10. A dowelling jig as claimed in claim 9 wherein said centerline marker indicia comprises an indicating line on said second face extending perpendicularly from said reference edge-line toward the axis of said peg.

* * * * *